March 3, 1953 W. G. E. SMITH 2,630,293
GATE VALVE
Filed June 23, 1948
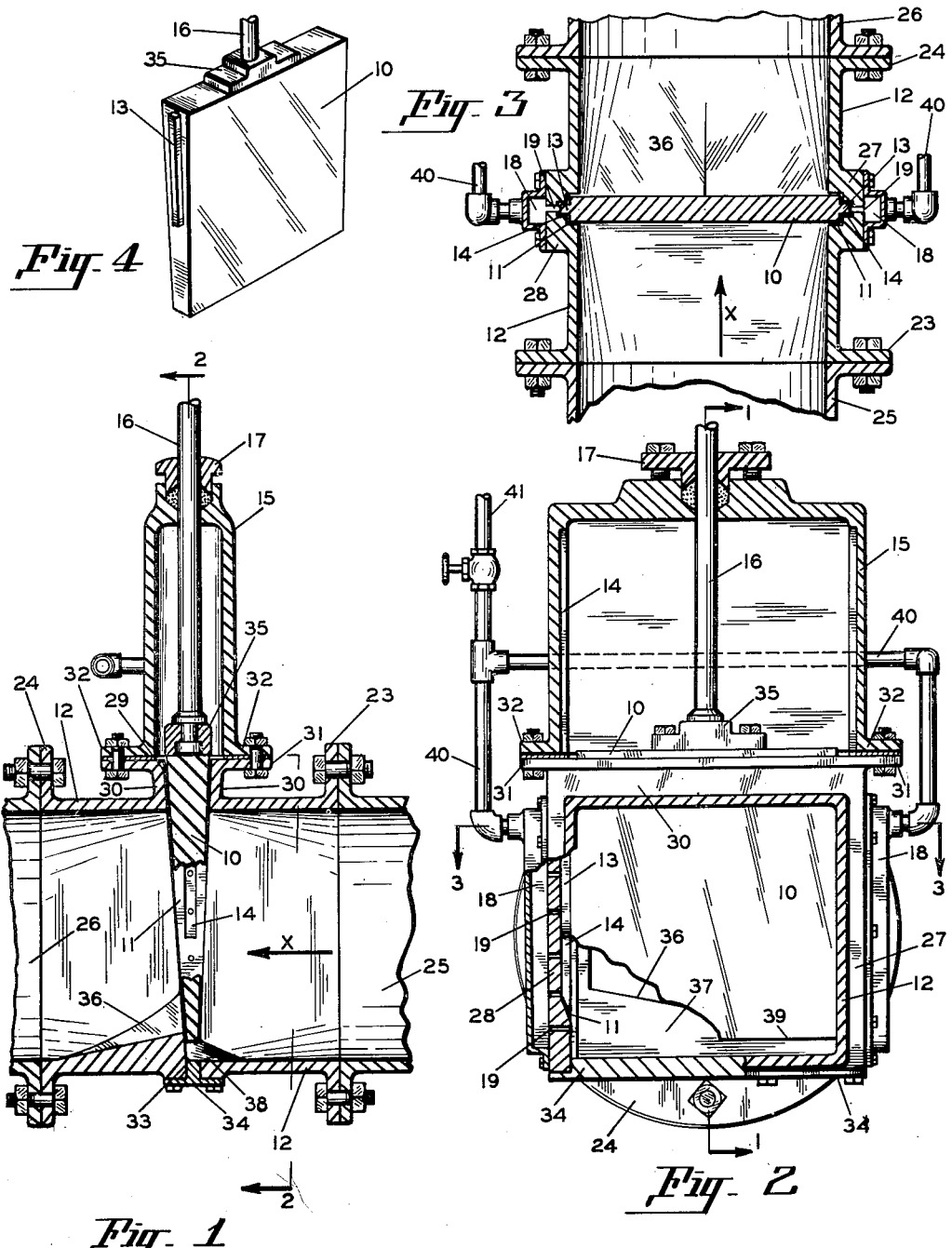
INVENTOR.
WALTER G. E. SMITH
BY
F. R. Geisler
ATTORNEY

Patented Mar. 3, 1953

2,630,293

UNITED STATES PATENT OFFICE 2,630,293

GATE VALVE

Walter G. E. Smith, Long Branch, Wash.

Application June 23, 1948, Serial No. 34,760

3 Claims. (Cl. 251—59)

This invention relates in general to gate valves in pipe lines, and, more particularly, to gate valves for controlling the flow of heavily laden liquids, such as crude oil, or sewage, in which there may be considerable sediment or other material tending to clog the valve.

The primary object of this invention is to provide an improved bevel type gate valve in which the valve seat will at all times be kept clear of material which might otherwise have a tendency to collect about the valve seat and interfere with the complete closing of the valve. It is customary in standard bevel type gate valves to have a trap or slot at the bottom of the valve body, but I have found that it is possible and desirable to eliminate such trap or slot entirely and thus avoid all possibility of sedimentary material of any kind lodging at such point, and at the same time produce an efficient valve which will be simple and easy to operate and which will effectively control not only steam and light liquids but also heavy fluids carrying solids in suspension. A related object therefore is to provide an improved bevel type gate valve which has no groove at the bottom of the valve body in which sedimentary material of any kind may lodge and thereby prevent a perfect closure of the valve.

Another object is to provide an improved gate valve in which the guideways for the valve can be cleared of any material lodging therein, especially sticky deposits, gravel, etc., which might cause the gate to stick or to be harder to operate and which would result in excessive wear on the bearing surfaces.

A further object of the present invention is to provide an improved gate valve which will continue to function for a prolonged period with a minimum amount of care and which will continue to effect a perfect closure in the pipe line even after prolonged ordinary wear.

An additional object of this invention is to provide an improved gate valve for use with heavily laden liquids which will be relatively simple in construction and economical and practical for manufacturing.

The manner in which these objects and other advantages are attained in my improved valve will become apparent from the following brief description of the same with reference to the accompanying drawings:

In the drawings:

Fig. 1 is a vertical, longitudinal section along the center line of the valve, showing the gate in closed position and with a portion of the gate broken away to show the groove in which the gate slides on each side of the valve housing, the section being taken on the vertical plane indicated by line 1—1 of Fig. 2;

Fig. 2 is a transverse section corresponding to line 2—2 of Fig. 1, with a portion of the housing and with one of the lower corners of the gate broken away to show the housing construction more clearly;

Fig. 3 is a plan section on the plane indicated by the lines 3—3 in Fig. 2; and

Fig. 4 is a view in perspective of the gate itself entirely removed from the valve housing.

The main housing for the gate valve is indicated by the reference character 12. The housing is cylindrical at each end to correspond to the dimension of the pipe line in which it is located, but becomes more or less rectangular in contour at its middle portion. At each end the housing is formed with an annular flange 23 or 24 (Figs. 1 and 3) by means of which the housing is secured to correspondingly flanged ends of the adjoining pipe line section 25 and 26, respectively. A pair of broad integral vertical ribs 27 and 28 (Fig. 3) are formed on the outside of the middle portion of the housing 12, and a vertical wedge-shaped groove 11 on the interior face of each side wall of the housing within the ribbed portion accommodates the gate 10. The gate 10, as apparent from Figs. 1 and 4, has its two main faces extending in converging planes and thus is of the wedge-shaped type.

The top wall of the middle portion of the housing 12 is formed with a transversely extending wedge-shaped slot 29 (Fig. 1), and the top wall of the housing on both sides and at the ends of this slot is extended upwardly a slight distance, as shown at 30 in Fig. 1, and terminates in a horizontal flange 31 extending outwardly from the slot 29. A supplemental sealed bonnet 15 is positioned above, and communicates with, the slot 29, and the side walls of this bonnet terminate at the bottom in a flange 32. The bonnet 15 is secured to the housing 12 by means of bolts extending through the flanges 31 and 32 and a suitable sealing ring is placed between these two flanges to complete a water-tight seal.

A narrow slot 33 (Fig. 1) extends transversely across the bottom of the housing 12 below the grooves 11 and the center line of this slot 33 is in direct vertical alignment with the center line of the upper slot 29. A removable elongated plug 34, secured by screws to the bottom of the housing 12, seals this bottom slot 33.

The gate 10, in addition to being wedge-shaped, has a central rib 13 (Figs. 3 and 4) extending approximately half way down each side or end wall. The side faces of each of these ribs 13 are parallel and vertical. A pair of grooved guideways 14 in which the ribs 13 are slidable, extend down along the interior of the end walls of the bonnet 15 from top to bottom and continue down the grooves 11 at each side of the housing, as indicated in Figs. 1 and 2. The inner or bottom walls of these second grooves or guideways 14, within the wedge-shaped main grooves 11 of the housing 12 are approximately parallel to the corresponding surfaces of the main grooves 11 and extend down to a point slightly below the ribs 13 of the gate when the gate is in closed position. From such point they slope inwardly and downwardly to the inner surfaces of the main grooves 11, as illustrated in Fig. 2. The bottom ends of the ribs 13 are cut off square to aid in pushing down any material which may become lodged in these guideways. The purpose of the ribs 13 and guideways 14 is to maintain the gate 10 in approximate alignment when it is being operated.

A valve stem may be attached to the gate in any suitable manner. Thus I show a block 35 attached by screws to the top of the gate 10, to which the valve stem 16 is secured, (Figs. 1 and 2). The valve stem 16 extends upwardly through packing 17 at the top of the valve bonnet 15 and is connected to any suitable means (not shown) which may be employed for raising and lowering the stem 16 and gate 10, and thus opening or closing the valve.

The arrows x in Figs. 1 and 3 indicate the direction of flow of liquid in the pipe line in which the valve is installed. The bottom of the valve housing 12 on the outlet side is formed into a broad upwardly-sloping V-shaped channel 36 which slopes upwardly from the discharge end of the housing to the edges of the side grooves 11 and terminates in a transverse wall 37 extending downwardly in the plane of the adjacent edges of the grooves 11 (Fig. 2) and thus constitutes the bearing surface for the lower portion of one face of the gate 10 when the gate is in lowered or closed position and prevents any possible warping of the closed gate. Instead of this V-shaped channel the outlet side may have a rounded bottom the same as in any standard gate valve. The bottoms of the grooves 11 are cut away on the inlet side, as shown at 38 in Fig. 1, to facilitate the clearing of any material which otherwise might have a tendency to collect at the bottom of these grooves. The bottom edge 39 of the gate 10 (Fig. 2), when the gate is in closed position, does not come entirely to the bottom of the transverse wall 37, but a slight space is left below the bottom edge of the closed gate, as shown in Fig. 2, which connects with the cutaway bottom portions 38 of the grooves 11 at each side.

A steam jacket 18 (Figs. 2 and 3), which may be cast integrally with the valve body or bolted thereto, extends vertically down the outer wall of each of the broad vertical ribs 27 and 28 of the housing 12. Small holes 19 extend through the housing wall from the steam jackets to the grooves 11 and to the recessed guideways 14 within the grooves 11. Branch pipes 40 connect each of the steam chambers 18 with a main steam pipeline 41 through which steam under pressure from any suitable source (not shown) can be delivered into the steam chambers 18 and thence forcibly discharged through the holes 19 to take care of any sticky deposits which might have accumulated in the grooves or guideways and which are not removed by the ordinary flow of the crude oil or other heavily laden liquid through the valve housing. Air or hydraulic pressure may be used similarly in place of steam depending on the character of the material being handled.

The fact that the gate 10 and the grooves 11 in which the gate is positioned are wedge-shaped, the fact that the ribs 13 and cooperating guideways 14 keep the gate centrally positioned in the grooves 11, and the fact that the grooves 11 are cut away at 38 at their bottoms, all contribute in preventing the sticking of the gate in the grooves and in reducing the wear on the gate and grooves and in keeping the grooves normally clear of the deposits. The provision for delivering jets of a cleaning medium into the grooves 11, whereby any gummy or sticky accumulations in the grooves can be quickly dissolved or dislodged is a further factor in insuring reliable performance over a prolonged period of time and with only a minimum amount of care.

I claim:

1. In a gate valve of the character described, a wedge-shaped gate having its two faces located in downwardly converging planes, a housing provided with inlet and outlet ports, wedge-shaped grooves in the side walls of said housing to accommodate said gate, said gate movable up or down within said grooves, vertical ribs of less thickness than said gate, centrally positioned on the side edges of said gate, vertical guideways for said ribs centrally positioned within said grooves, said ribs and said guideways acting to hold said gate steady and centrally positioned with respect to said grooves when said gate is in raised position, vertically-extending chambers in the side walls of said housing substantially in registration with said grooves respectively, discharging ports for said chambers extending through the housing walls to said grooves, whereby when a fluid under pressure is delivered into said chambers the discharge of said fluid through said ports will aid in keeping said grooves clear, a slot extending across said housing at the upper ends of said grooves, and a bonnet positioned above said slot to accommodate said gate when said gate is in raised position, said vertical guideways continuing up into said bonnet.

2. A gate valve of the character described including a wedge-shaped gate having its two faces located in downwardly converging planes, a housing provided with inlet and outlet ports, wedge-shaped grooves in the side walls of said housing to accommodate said gate, said gate movable up or down within said grooves, a portion of one wall of each groove being cut away at the bottom to facilitate the pushing of material out of said grooves, vertical ribs of less thickness than said gate, centrally positioned on and extending down the side edges of said gate from the top, the bottom ends of said ribs cut off square, vertical guideways for said ribs centrally positioned within said grooves extending down in said grooves from the top of said housing, the bottom ends of said guideways sloping downwardly and inwardly, said ribs and said guideways acting to hold said gate steady and centrally positioned with respect to said grooves when said gate is in raised position, chambers on the outside of the side walls of said housing substantially in registration with said grooves respectively, discharging ports for said chambers extending through the housing walls to said grooves and guideways, whereby when a fluid under pressure is delivered into said chambers the discharge of said fluid through said ports will aid in keeping said grooves and guideways clear, a slot extending across said housing at the upper ends of said grooves, a bonnet positioned above said slot to accommodate said gate when said gate is in raised position, said vertical guideways continuing up into said bonnet, a bottom slot extending across said housing at the bottom ends of said grooves, and a removable plug closing said latter mentioned slot.

3. In a gate valve of the character described, a housing having inlet and outlet ports, a wedge-shaped gate movable up and down in said housing and having its two faces extending in downwardly converging planes, a vertical wedge-shaped groove on each side of said housing engaging the adjacent portions of the faces of said gate when said gate is closed, a portion of one wall of each groove cut away at the bottom to prevent material from collecting in the bottom of said grooves, a vertical rib extending beyond each side edge of said gate, said ribs being of less thickness than said gate and centrally positioned on said side edges and extending from the top of said gate approximately half way down the gate, the opposite faces of each rib extending in parallel vertical planes, a pair of vertical guideways for said ribs centrally positioned in said grooves respectively and extending downwardly from the tops of said grooves for slightly more than half the distance to the bottom of said housing, the opposed walls of said guideways extending in the same parallel vertical planes as the opposite faces of said ribs respectively, said ribs and guideways acting to hold said gate steady and centrally spaced from the walls of said grooves when said gate is not in fully closed position, the bottom ends of said guideways terminating above the bottom ends of said grooves and sloping downwardly and inwardly above said cut-away portions of said grooves to enable material to be pushed down out of said guideways and the bottom ends of said ribs cut off square to facilitate pushing such material out from said guideways with the closing of said gate, a slot extending across the top of said housing and joining the tops of said grooves, a bonnet secured on said housing above said slot to enclose said gate, when said gate is raised, and said guideways continued up in said bonnet substantially to the top of said bonnet.

WALTER G. E. SMITH.

REFERENCES CITED

The following references are of record in the file of this patent:

UNITED STATES PATENTS

| Number | Name | Date |
|---|---|---|
| 534,360 | Collins | Feb. 19, 1895 |
| 709,491 | Kennedy | Sept. 23, 1902 |
| 1,731,222 | Blair | Oct. 8, 1929 |
| 2,000,853 | Lange | May 7, 1935 |
| 2,001,271 | Smith | May 14, 1935 |